United States Patent [19]

Pottier et al.

[11] Patent Number: 4,892,010
[45] Date of Patent: Jan. 9, 1990

[54] SEALED TRANSMISSION DEVICE USING METAL BELLOWS, SUITABLE FOR QUARTERTURN VALVES

[75] Inventors: Daniel Pottier; Rémy Leclaire; Paul Vulliez, all of Pont-Audemer, France

[73] Assignee: 501 Normetex, Pont-Audemer, France

[21] Appl. No.: 214,610

[22] Filed: Jul. 1, 1988

[30] Foreign Application Priority Data

Jul. 2, 1987 [FR] France .................. 87 09402

[51] Int. Cl.⁴ .......................... F16C 3/04; F16J 15/50
[52] U.S. Cl. ...................................... 74/595; 74/18.1; 74/63; 74/68
[58] Field of Search ................ 74/63, 67, 68, 18.1, 74/18, 595, 596, 597, 598, 599, 600, 601, 602

[56] References Cited

U.S. PATENT DOCUMENTS

| | | | |
|---|---|---|---|
| 2,522,735 | 9/1950 | Zagar | 74/63 |
| 3,082,632 | 3/1963 | Vulliez | 74/18.1 |
| 3,782,685 | 1/1974 | Gallagher et al. | 74/18.1 X |
| 4,440,004 | 4/1984 | Bochan | 74/63 X |
| 4,556,182 | 12/1985 | Bentall et al. | 74/18.1 X |
| 4,646,579 | 3/1987 | Klein | 74/18.1 |

FOREIGN PATENT DOCUMENTS

| | | | |
|---|---|---|---|
| 459557 | 9/1949 | Canada | 74/68 |
| 0180903 | 5/1986 | European Pat. Off. | |
| 1280128 | 11/1961 | France | |
| 78156 | 5/1962 | France | |
| 706627 | 12/1979 | U.S.S.R. | 74/68 |
| 1262164 | 10/1986 | U.S.S.R. | 74/63 |
| 826513 | 1/1960 | United Kingdom | |
| 894529 | 10/1960 | United Kingdom | |
| 2155580 | 9/1985 | United Kingdom | |

*Primary Examiner*—Vinh T. Luong
*Attorney, Agent, or Firm*—Perry Carvellas

[57] ABSTRACT

A sealed rotary transmission device comprises a control shaft and a receiver shaft parallel to and spaced from the control shaft. A bellows surrounds the receiver shaft, and has one end fixed in a sealed way to a casing of the device. The device also includes a transfer member constrained to move parallel to a plane perpendicular to the receiver shaft. The other end of the bellows is fixed to this transfer member in a sealed way. On each of the control and receiver shafts is a respective crank, eccentric to its axis by the same distance. These cranks are coupled to the transfer member and spaced by the same distance as the shafts. This enables circular translation of the transfer member.

10 Claims, 2 Drawing Sheets

SEALED TRANSMISSION DEVICE USING METAL BELLOWS, SUITABLE FOR QUARTERTURN VALVES

BACKGROUND OF THE INVENTION

1. Field of the invention

The invention concerns a bellows type sealed transmission device suitable for controlling a high-security valve which is operated by a quarter-turn rotation or less. The invention is directed to simplifying the structure of this type of device and to improving the working conditions of the bellows in order to increase its reliability and durability.

2. Description of the prior art

There is a known metal bellows type sealed control device designed to be associated with a valve mechanism, the bellows isolating the mechanism from the external environment. A device of this kind has been developed for the requirements of the nuclear industry, for controlling a valve that may be in contact with a toxic and radioactive fluid. This device comprises a control shaft and a receiver shaft isolated from each other. The bellows is disposed to surround the receiver shaft completely and it is welded in a sealed way by its axial ends to a fixed part of the casing of the device, on the one hand, and to a mobile transfer member coupled both to the receiver shaft and to the control shaft, on the other hand. For the bellows to be durable in exercizing its function, it is essential that it is not subjected to any torsion force. This is why the transfer member, which is generally flat, is constrained to move in such a way as to perform a so-called "circular-translation" movement. This movement may be obtained positively by an appropriate kinematic system or in a "resultant" way by virtue of various mechanical prohibition means. The former is preferable but generally requires complicated and costly mechanisms. Devices of this kind are described, for example, in British Patent No. 826 513 and in Patent of Addition No. 78 358 to French Patent No. 1 248 634 which corresponds to U.S. Pat. No. 3,082,632 issued to Vulliez on Mar. 26, 1963. This Patent of Addition describes an embodiment which is particularly suited to controling a quarter-turn valve.

Until now the complexity of known systems has limited their application to specific fields, in particular the nuclear industry. A first objective of the invention is to simplify this type of control device using a metal bellows in order to diversify its application into other sectors of the chemicals industry. The invention is particularly directed to the operation of a quarter-turn valve by means of a bellows type sealed transmission device in which the aforementioned "circular-translation" movement is generated positively by an appropriate kinematic system of simple design.

The basic idea of the invention, from which the structural simplification results, consists in physically offsetting the control shaft and the receiver shaft by placing the axes of these two shafts at the ends of one side of a deformable parallelogram type articulaion system including said transfer member.

SUMMARY OF THE INVENTION

The present invention consists in a sealed rotary transmission device comprising a control shaft, a receiver shaft parallel to and spaced from said control shaft, a bellows surrounding said receiver shaft, a casing to which one end of said bellows is fixed in a sealed way, a transfer member constrained to move parallel to a plane perpendicular to said receiver shaft and to which the other end of said bellows is fixed in a sealed way, and a respective crank on each of said control and receiver shafts eccentric to the axis thereof by the same distance, coupled to said transfer member and spaced by the same distance as said shafts, to enable circular translation of said transfer member.

Another objective of the invention is to optimize the trajectory of the end of the bellows attached to the transfer member, to reduce the offset to which the bellows is subjected during its actuation travel and consequently to reduce fatigue stresses on this fragile member. With this in view, the invention is also concerned with a device as defined hereinabove in which the center of the perimeter where the bellows joins the transfer member is offset relative to the axis of said receiver shaft in a direction tending to reduce said offset. These arrangements, whereby the bellows is less stressed and its strength under pressure is improved, lead to a very rugged construction of the parts subjected to the torque to be transmitted, which can be very high in certain industrial applications of this type cf quarter-turn valve.

The invention will be better understood and other advantages of the invention will emerge more clearly from the following description of a sealed transmission device in accordance with the invention, given by way of example only with reference to the appended drawings.

DESCRIPTION OF THE PREFERRED EMBODIMENT

Figure 1:
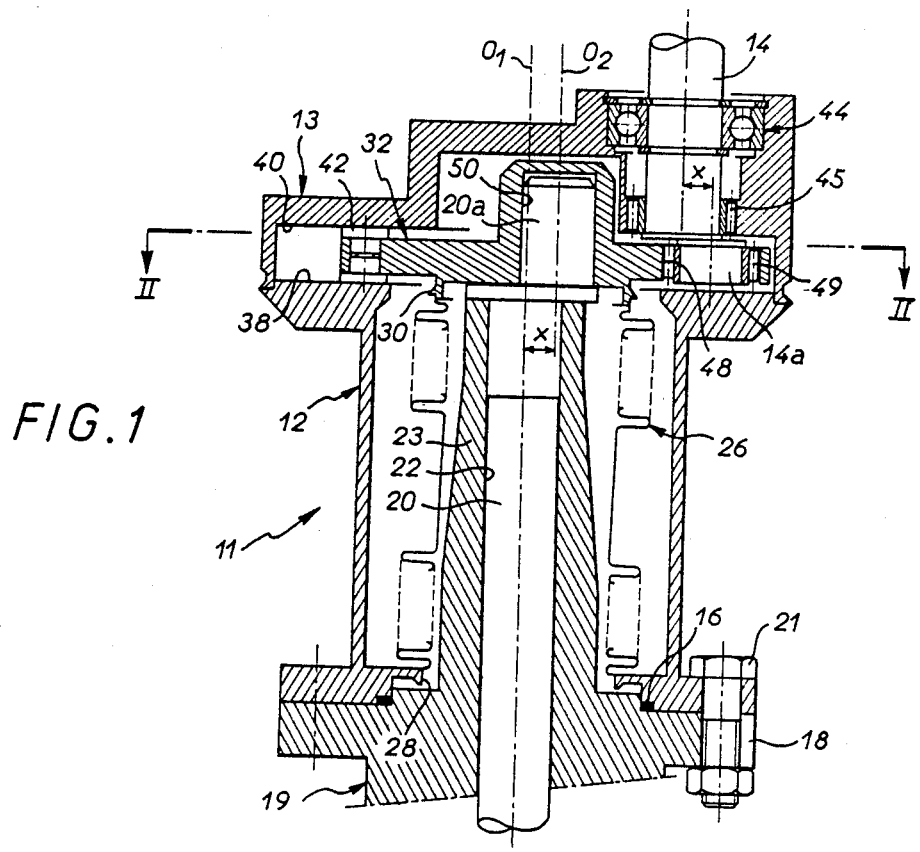
FIG. 1 is a view in elevation of a bellows type control device in accordance with the invention, shown in cross-section on the line I—I in FIG. 2.
Figure 2:
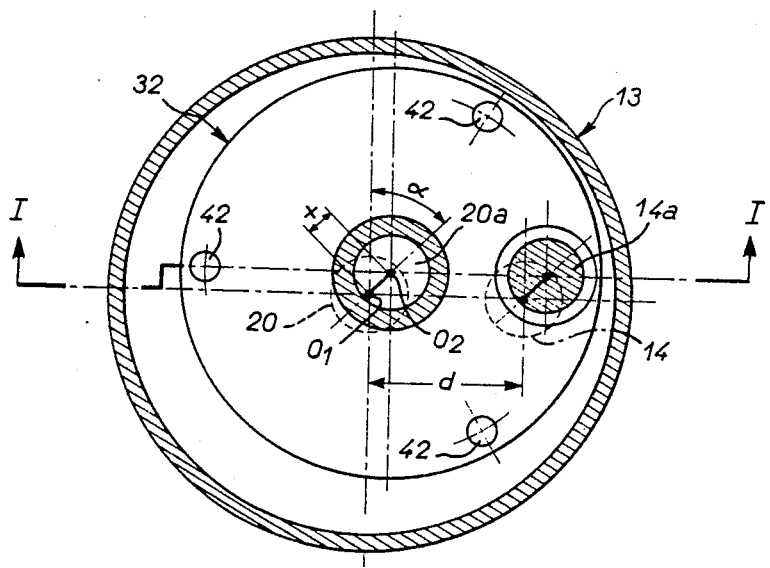
FIG. 2 is a cross-section on the line II—II in FIG. 1.

Referring to the drawings, the sealed transmission device comprises a casing 11 consisting of a substantially cylindrical tubular body 12 with annular flanges at its axial ends and surmounted by a member forming a cover 13 in which a control shaft 14 is rotatably mounted. The body 12 is assembled by one of its flanges to another flange 18 of a structural member 19 enclosing a mechanism actuated by a receiver shaft 20 of the transmission device. The body 12 is assembled to the flange 18 by bolts 21 with an annular gasket 16 between them. The mechanism actuated by the shaft 20 is not shown. It may be a valve mechanism, for example. The receiver shaft 20 is guided in the bore 22 of a bush 23 attached to the structural member 19; in this example this bush is forged in one piece with said structural member. A metal bellows 26 surrounds the bush 23 and consequently the receiver shaft 20. One end of the bellows is fixed in a sealed way, in this example by welding, to a fixed part of the casing consisting in this example of a ring 28 projecting inwardly from the wall of the tubular body 12, in the vicinity of the end of the latter which is assembled to the structural member 19. The other end of the bellows is assembled in a sealed way (welded) to another ring 30 projecting from the wall of a transfer member 32 constrained to move inside the casing 11, parallel to a plane perpendicular to the axis $O_1$ of the receiver shaft 20. This transfer member 32 is disk-shaped overall and its radially outermost part is engaged between two parallel annular guide surfaces 38, 40 belonging respectively to the body 12 and to said cover 13. This transfer member is provided with pegs 42 through which it is in sliding contact with the two annular surfaces 38, 40.

According to an important characteristic of the invention, the control shaft 14 and the receiver shaft 20 are parallel, being spaced from each other by a distance d (as measured between their axes) and situated one to each side of the transfer member 32, each shaft comprising a respective crank 14a, 20a eccentric by a common pre-determined distance x from its own axis. The two cranks 14a, 20a are coupled to the transfer member, being spaced by the same distance d as the shafts themselves. This defines a deformable parallelogram articulation structure including said transfer member and adapted to allow circular translation of the transfer member and consequently of the end of the bellows 26 that is attached to it.

The control shaft 14 is rotatably mounted in an appropriate housing of said member forming the cover 13, with a ball bearing 44 and a needle roller bearing 45 spaced coaxially from each other placed between them. The crank 14a associated with this shaft is in the form of a journal inserted into a hole 48 formed in the transfer member externally of the bellows. A needle roller bearing 49 is disposed between the lateral surface of this hole and that of the journal. The crank 20a associated with the receiver shaft is also in the form of a journal inserted in a blind hole 50 formed in the transfer member 32 and opening into the center of the latter, inside the bellows 26. At this stage in the description it is seen quite clearly that any trace of toxic fluid that might flow between the shaft 20 and the bore 22 cannot escape from the space delimited by the bellows 26 and the transfer member 32.

Figure 3:
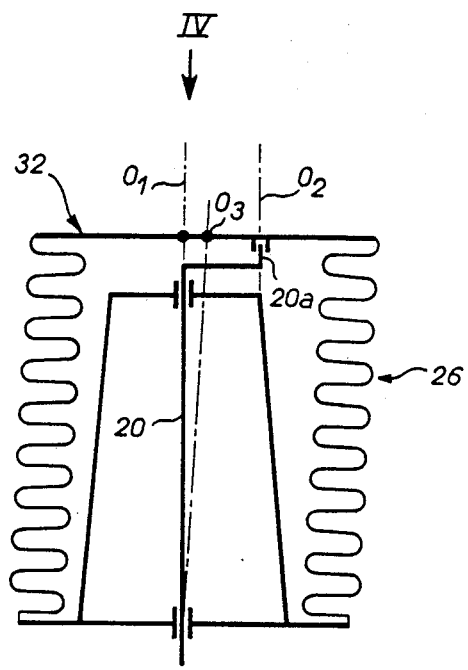
FIG. 3 is a simplified schematic view of the device from FIG. 1 shown in cross-section in the plane which bisects the trajectory of the crank on the receiver shaft and explains one characteristic of the invention.
Figure 4:
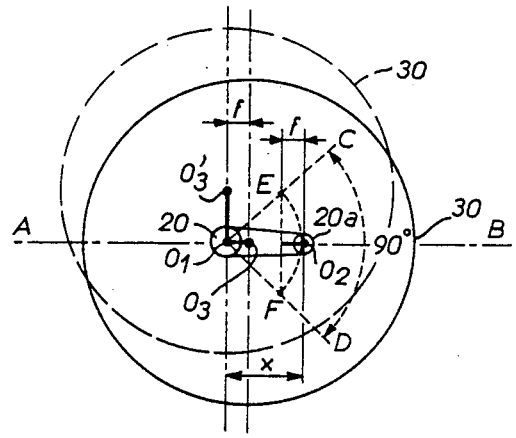
FIG. 4 is another simplified schematic view as seen in the direction of the arrow IV in FIG. 3.

FIGS. 3 and 4 explain another important characteristic of the invention. In these figures only the receiver shaft 20 and its crank 20a have been represented, together with the bellows 26 and the transfer member 32. Also, these figures show the crank 20a at the center of the actuation travel of the device, that is to say when the axis $O_2$ of the journal constituting this crank is in the plane AB bisecting its own trajectory inscribed within the right angle CO/D in FIG. 4. This trajectory is represented by the circular arc EF. In accordance with the invention, the center $O_3$ of the perimeter where the bellows joins onto the transfer member 32 (that is to say, in concrete terms, the center of the ring 30) is offset from the axis $O_1$ of the receiver shaft in a direction adapted to reduce the offset of the bellows during the displacement of the transfer member. The offset of the center $O_3$ is such that it is substantially in the bisecting plane AB and between the two parallel axes $O_1$ and $O_2$ of the shaft 20 and its crank 20a when said shaft is at the middle of its trajectory. In an embodiment that is currently preferred, this offset is chosen so that the projection of the center $O_3$ on the axis $O_1$ of the receiver shaft when the crank is at the middle of its trajectory is substantially equal to the value of the dip f of the arc EF. Under these conditions, when it moves in circular translation, the center $O_3$ moves to $O'_3$ in a plane perpendicular to the bisecting plane AB when the crank arrives at the end E of its trajectory. The position of the ring 30 at the end of its travel is shown in dashed line in FIG. 4 and the distance $O_1O'_3$ represents the aforementioned offset. To give a numerical example, this offset is then 0.707 x whereas it would be 0.765 x if the center $O_3$ were on the axis $O_1$ of the shaft 20, as shown in the aforementioned Patent of Addition No. 78 358 of 27 June 1960 to French Patent No. 1 248 634.

We claim:

1. A sealed rotary transmission device comprising a control shaft, a receiver shaft parallel to and, spaced apart from said control shaft, a bellows having an upper end and a lower end surrounding said receiver shaft, a casing having an upper end and a lower end surrounding said bellows, the lower end of said bellows being fixed in a sealed way to the lower end of said casing, a transfer member having a radially outer most part is disposed in the upper end of said casing and constrained to move in said casing in a direction parallel to a plane which is perpendicular to said receiver shaft, the upper end of said bellows is fixed in a sealed way to said transfer member, a crank is attached to said control shaft and a crank is attached to said receiver shaft, the crank of the control shaft and the crank of the receiver shaft are eccentric to the axis of their respective control shaft and receiver shaft by the same distance, the crank of the control shaft and the crank of the receiver shaft are each coupled to said transfer member and are spaced apart by a distance which is equal to the distance between the control shaft and the receiver shaft, to enable circular translation of said transfer member, and the upper portion of said casing comprises two annular guide surfaces between which the radially outermost part of said transfer member is inserted and guided in its movement.

2. The transmission device of claim 1 wherein said transfer member is substantially disk-shaped.

3. The transmission device according to claim 1, wherein said crank of said receiver is in the form of a journal and said transfer member comprises a blind hole into which said journal is inserted.

4. The transmission device according to claim 1, wherein said crank of said control shaft is in the form of a journal and said transfer member comprises a hole having a lateral wall into which said journal is inserted.

5. The transmission device according to claim 4, further comprising a needle roller bearing disposed between said journal and the lateral wall of said hole in said transfer member into which said journal is inserted.

6. The transmission device according to claim 1, wherein the upper end of the bellows at which the bellows is fixed to the transfer member has an outer perimeter which is circular in shape, and the center of the perimeter is offset in a direction perpendicular to the axis of the receiver shaft.

7. The transmission device according to claim 6, wherein the axis of the crank of the receiver shaft on movement of the receiver shaft has a trajectory which in the full travel of the crank of the receiver shaft forms a circular arc and the offset of the center of the outer perimeter of the bellows is disposed substantially in a plane bisecting between the two parallel axes of said receiver shaft and said crank of said receiver shaft when said crank is at the middle of its trajectory.

8. The transmission device according to claim 7, wherein the offset of said center is such that its projection on to the axis of said receiver shaft when said crank of said receiver shaft is at the middle of its trajectory is substantially equal to the value of the dip of the circular arc described by the axis of said crank over the full travel of the crank.

9. A sealed rotary transmission device comprising a control shaft, a receiver shaft parallel to and, spaced apart from said control shaft, a bellows having an upper end and a lower end surrounding said receiver shaft, a casing having an upper end and a lower end surrounding said bellows, the lower end of said bellows being fixed in a sealed way to the lower end of said casing, a transfer member having a radially outer most part is disposed in the upper end of said casing and constrained to move in said casing in a direction parallel to a plane which is perpendicular to said receiver shaft, the upper end of said bellows is fixed in a sealed way to said transfer member, a crank is attached to said control shaft and a crank is attached to said receiver shaft, the crank of the control shaft and the crank of the receiver shaft are eccentric to the axis of their respective control shaft and receiver shaft by the same distance, the crank of the control shaft and the crank of the receiver shaft are each coupled to said transfer member and are spaced apart by a distance which is equal to the distance between the control shaft and the receiver shaft, to enable circular translation of said transfer member, the upper end of the bellows at which the bellows is fixed to the transfer member has an outer perimeter which is circular in shape, and the center of the perimeter is offset in a direction perpendicular to the axis of the receiver shaft, and the axis of the crank of the receiver shaft on movement of the receiver shaft has a trajectory which is the full travel of the crank of the receiver shaft forms a circular arc and the offset of the center of the outer perimeter of the bellows is disposed substantially in a plane bisecting between the two parallel axes of said receiver shaft and said crank of said receiver shaft when said crank is at the middle of its trajectory.

10. The transmission device according to claim 9, wherein the offset of said center is such that its projection on to the axis of said receiver shaft when said crank of said receiver shaft is at the middle of its trajectory is substantially equal to the value of the dip of the circular arc described by the axis of said crank over the full travel of the crank.

* * * * *